United States Patent Office 3,362,840
Patented Jan. 9, 1968

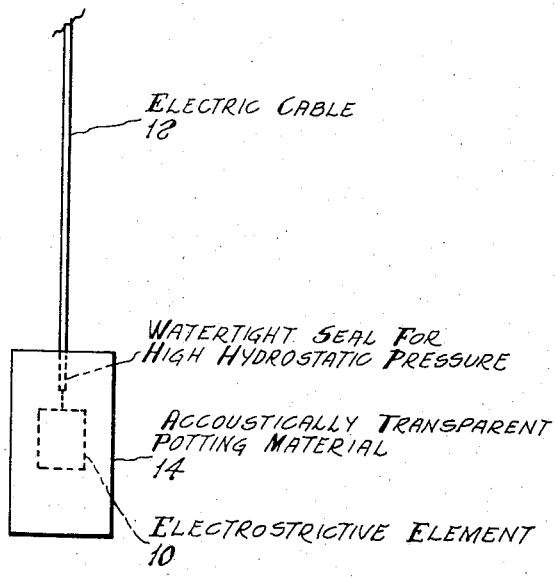

3,362,840
METHOD OF SEALING AN UNDERWATER TRANSDUCER USING FLAME TREATMENT OF THE COATED SURFACE
Markay H. Malootian, Quaker Hill, and Winslow W. Prentice, Waterford, Conn., assignors to the United States of America as represented by the Secretary of the Navy
Filed June 23, 1964, Ser. No. 377,427
2 Claims. (Cl. 117—46)

ABSTRACT OF THE DISCLOSURE

A watertight joinder between an electric conductor with an outer insulation covering of polyethylene, polyvinyl chloride, polypropylene, or tetrafluoroethylene, with a watertight potting resin, sealant, or adhesive carried by sonar equipment for a watertight seal. The surface area of the outer insulation covering to be joined in the watertight seal is coated with either liquid diphenyl methane diisocyanate or liquid tolylene diisocyanate. Then a gas flame is rapidly swept across the coated surface to burn off the coating without scorching the basic material. Then the surface is painted with a primer compatible with the selected potting resin, sealant or adhesive and is joined thereto.

---

The invention described herein may be manufactured and used by or for the Government of the United States of America for governmental purposes without the payment of any royalties thereon or therefor.

This invention relates to bonding techniques for hard to bond synthetic materials, more particularly, this invention relates to improvements in the watertight integrity of an assembly of an underwater transducer equipment and the electrical cable therefor for use under high hydrostatic pressure.

Polyethylene, polyvinyl chloride, polypropylene and tetrafluoroethylene are examples of hard to bond synthetic materials that have properties desirable for underwater electric cables, namely, high dielectric strength and low water absorption. Polypropylene has the additional advantage of low specific gravity for this type of material.

There has been progressive increase of the depth at which sonar is used. In those sonars where the electric cabling is in the water, problems of water absorption and water leakage have increased with increase in hydrostatic pressures. Various materials conventionally used as insulating jackets on electric cables absorb considerable water and, in effect, leak. Polyethylene and polyvinyl chloride covered wires and cables which have been readily obtainable and widely used have very low absorption but there has been a problem of forming a watertight seal between the electric cabling and the transducer. Mechanical waterproofing devices such as stuffing tubes are not satisfactory under high hydrostatic pressure, e.g. several thousand pounds per square inch. Cabling having insulating jackets of the more conventional materials were used in many cases under high hydrostatic pressures despite their high water absorbing characteristic, because they could be bonded and sealed easily to a variety of potting or sealing materials.

An object of this invention is to condition surface areas of polyethylene, polyvinyl chloride, polypropylene, tetrafluoroethylene, and the like for inexpensive, low temperature, facile, reliable, durable, watertight bonding to a variety of resins, adhesives, and primers.

A further object is to provide a watertight seal between a sonar transducer and an electrical cable having outside insulation of polyethylene, polyvinyl chloride, polypropylene, or tetrafluoroethylene.

A further object is to provide a technique for sealing polyethylene and polyvinyl chloride covered wires and cables in underwater transducers and other sonar apparatus, and in other underwater electrical apparatus.

A further object is to provide a technique for bonding polyethylene elements and polyvinyl chloride elements to metals, plastics, ceramics, and rubbers.

A further object is to provide a bonding technique for the hard to bond materials which can be carried out on apparatus that is completely assembled or nearly completely assembled and having temperature or pressure sensitive elements, which requires no complex molds, which is applicable following partial disassembly and reassembly of a completed system for the making of modifications or repairs and which may be used on board ship without need for special training in the technique.

Other objects and advantages will appear from the following description of an example of the invention, and the novel features will be particularly pointed out in the appended claims.

The single figure shows an underwater transducer and electric cable with a pressureproof seal in accordance with this invention.

To practise the invention, first the surface area of the element of polyethylene, polyvinyl chloride, polypropylene, or tetrafluoroethylene is cleaned of grease and dirt with standard cleaning solvents. Then the surface area to be bonded is coated with either liquid diphenyl methane diisocyanate or liquid tolylene diisocyanate which may be brushed on. For this invention, it is not critical whether the diisocyanate is clear and water white or yellowish. Then the gas flame of a propane gas torch, Bunsen burner, or the like, is rapidly swept across the coated surface to burn off the coating without scorching the basic material. While not essential to the broader aspects of the invention, the steps of coating and burning off the diisocyanate may be repeated once or twice until the surface manifests a slight amber coloration. This improves the subsequent bond or seal. Then the surface is painted with a primer to which the selected potting resin, sealant, or adhesive will bond. Various primers and various resins, sealants and adhesives have been used successfully. Investigations indicate that any metal primer will work. Polyurethane potting or casting resins are commonly used in the transducer art. One example of a suitable commercially marketed primer for polyurethane is PR420 which is a pigmented chlorinated resin based polyurethane coating marketed by Products Research Company of Burbank, Calif.

In the drawing, an electrostrictive element 10 is electrically connected to a cable 12 that is jacketed with polyethylene, etc.; the combination is sealed in acoustically transparent potting material 14 in accordance with the technique described above. Particularly good results have been realized with this invention.

Polyethylene or polyvinyl chloride can be bonded to itself by fusion methods; to satisfactorily bond these materials to other materials is at best so difficult as to be unsatisfactory for sonar and more generally for meeting the requirements recited in the objects. These fusion methods involve temperatures of 200° F. and higher with adhesives such as polybutadiene, or a graded seal technique. Besides the difficulty of carrying out these methods, the high temperature prevents their application in the presence of temperature sensitive elements such as barium titanate, and other ceramic materials commonly used in sonar transducers. Furthermore, these prior art methods have limited utility in that they can be used for bonding to very few materials among which are some brass alloys and some rubbers.

Attempts at bonding polyethylene and polyvinyl chloride by using a torch for oxidizing the surface or by use of chromic acid have not produced satisfactory results.

The tolylene diisocyanate or diphenyl methane diisocyanate fire technique in accordance with this invention makes the surface molecules of the hard-to-bond plastic adherents receptive to a primer, sealing material, an adhesive, etc., substantially without elevating the temperature of the adherent. To date, this invention is the only means by which a permanent pressure proof seal between a lead-in cable and an opening in a metal housing through which it passes can be accomplished where the cable is jacketed with polyethylene, polyvinyl chloride, polypropylene and tetrafluoroethylene. This invention has been employed also on Celcon, Delrin and other hard-to-bond commercial plastics with success.

With this technique for sealing polyethylene, polyvinyl chloride, polypropylene and tetrafluoroethylene covered wires against water leakage under several thousand pounds per square inch of hydrostatic pressure, design and development of underwater transducer systems and other underwater electrical apparatus are advanced. With increased use of sonar systems, illumination devices, and other electrical apparatus at increased depth, there has been a growing need for low water absorbing materials such as polyethylene, polyvinyl chloride, polypropylene and tetrafluoroethylene. Since neither high temperature nor complex molds are required in carrying out this invention, the bonding of these materials in underwater transducers and other underwater electrical apparatus is greatly simplified and can be carried out at almost any stage of the construction of the apparatus. Where high temperatures or complex molds are employed, the bonding or sealing would have to be carried out prior to assembly in order to avoid effecting temperature and/or pressure sensitive elements in the apparatus. With this invention the apparatus can be completely or nearly completely assembled before sealing. Whenever changes or repairs are to be made on a completed system, partial disassembly and reassembly can be carried out reliably and expeditiously with minimum difficulty, even on board ship without special training.

It will be understood that various changes in the details, materials and arrangements of parts (and steps), which have been herein described and illustrated in order to explain the nature of the invention, may be made by those skilled in the art within the principle and scope of the invention as expressed in the appended claims.

What is claimed is:

1. A method of making an improved watertight bond between an underwater transducer equipment and an electric cable therefor comprising the steps of
   cleaning surface area of an electric cable having surrounding insulation of a material selected from the group consisting of polyethylene, polyvinyl chloride, polypropylene, and tetrafluoroethylene, with a cleaning solvent near one end of the cable,
   coating said clean surface area with a material selected from the group consisting of liquid diphenyl methyl diisocyanate and liquid tolylene diisocyanate,
   gently brushing the coated surface with a hot flame until the coating is substantially burned off without scorching the basic material,
   applying a thin coating with a primer onto the surface area from which diisocyanate coating was substantially burned off, and then joining the primed surface area to the underwater transducer equipment with a material selected from the group consisting of potting resins, sealants, and adhesives, to which the primed surface area is bonded.

2. A method as defined in claim 1, wherein
   the steps of coating with diisocyanate and burning off the coating are repeated until an amber coloration appears on said surface area.

References Cited

UNITED STATES PATENTS 3,099,572   7/1963   Rion et al. _____ 117—138.8 X

ALFRED L. LEAVITT, *Primary Examiner.*

H. COHEN, *Assistant Examiner.*